(12) United States Patent
Vaidyanathan et al.

(10) Patent No.: US 7,080,183 B1
(45) Date of Patent: Jul. 18, 2006

(54) REPROGRAMMABLE APPARATUS SUPPORTING THE PROCESSING OF A DIGITAL SIGNAL STREAM AND METHOD

(75) Inventors: Krishnamurthy Vaidyanathan, Ossining, NY (US); Dagnachew Birru, Yorktown HTS., NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1051 days.

(21) Appl. No.: 09/639,149

(22) Filed: Aug. 16, 2000

(51) Int. Cl.
*G06F 1/00* (2006.01)

(52) U.S. Cl. ............ 710/305; 710/311; 710/314

(58) Field of Classification Search ........ 710/305–306, 710/308, 310–315, 316, 31, 35, 36, 38, 62–64, 710/69, 70, 72; 712/10, 18, 29, 31, 200–213, 712/225, 248, 222–223; 713/100, 2
See application file for complete search history.

(56) References Cited

U.S. PATENT DOCUMENTS

| | | | | |
|---|---|---|---|---|
| 4,926,355 A | * | 5/1990 | Boreland ................... 712/36 |
| 5,001,629 A | * | 3/1991 | Murakami et al. .......... 712/202 |
| 5,623,684 A | | 4/1997 | El-Ghoroury et al. ...... 395/800 |
| 5,689,653 A | * | 11/1997 | Karp et al. ................. 712/222 |
| 5,732,251 A | * | 3/1998 | Bartkowiak ................ 712/200 |
| 5,784,649 A | * | 7/1998 | Begur et al. ................. 710/72 |
| 5,941,968 A | * | 8/1999 | Mergard et al. ............ 710/306 |
| 6,005,937 A | * | 12/1999 | Lee ............................. 380/10 |
| 6,078,972 A | * | 6/2000 | Takai .......................... 710/69 |
| 6,189,094 B1 | * | 2/2001 | Hinds et al. ................ 712/222 |
| 6,223,230 B1 | * | 4/2001 | Garnett et al. ............... 710/26 |
| 6,233,637 B1 | * | 5/2001 | Smyers et al. ............. 710/306 |
| 6,237,069 B1 | * | 5/2001 | Fan ............................. 711/165 |
| 6,292,888 B1 | * | 9/2001 | Nemirovsky et al. ....... 712/225 |
| 6,415,345 B1 | * | 7/2002 | Wu et al. ................... 710/305 |
| 6,418,161 B1 | * | 7/2002 | Shively et al. ............. 375/222 |
| 6,487,654 B1 | * | 11/2002 | Dowling ..................... 712/244 |
| 6,636,747 B1 | * | 10/2003 | Harada et al. ........... 455/552.1 |
| 6,647,485 B1 | * | 11/2003 | Nguyen et al. .............. 712/23 |
| 6,675,187 B1 | * | 1/2004 | Greenberger ............... 708/622 |
| 6,799,269 B1 | * | 9/2004 | Dowling ..................... 712/244 |

* cited by examiner

*Primary Examiner*—John R. Cottingham
*Assistant Examiner*—Raymond N Phan
(74) *Attorney, Agent, or Firm*—Larry Liberchuk

(57) ABSTRACT

An architecture is provided that includes a reconfigurable bridge for routing data among functional units. Register transfer units effect the routing of data among registers that are associated with each functional unit. Synchronous and asynchronous register transfers are supported, including interrupt signal generation for efficient digital signal processor support. A preferred embodiment of the reconfigurable bridge includes a plurality of reconfigurable datapath units that provide ancillary functions to facilitate the processing and pre-processing of data items as they are transferred among registers. A preferred embodiment of the invention also includes an instruction memory that contains instructions to effect the desired register transfers and ancillary operations.

20 Claims, 3 Drawing Sheets

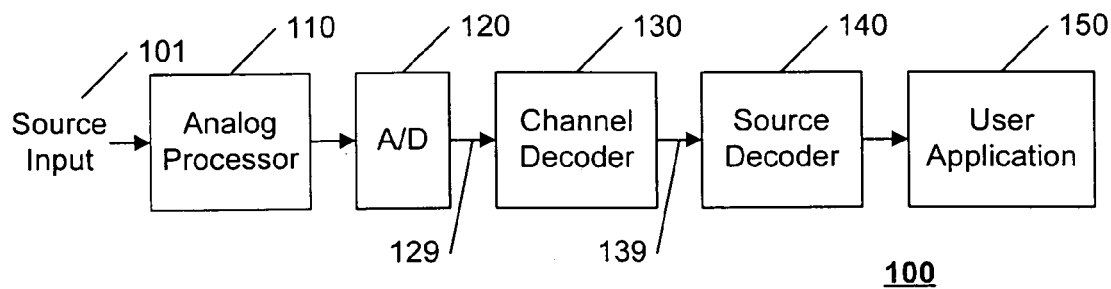
FIG. 1A [Prior Art]
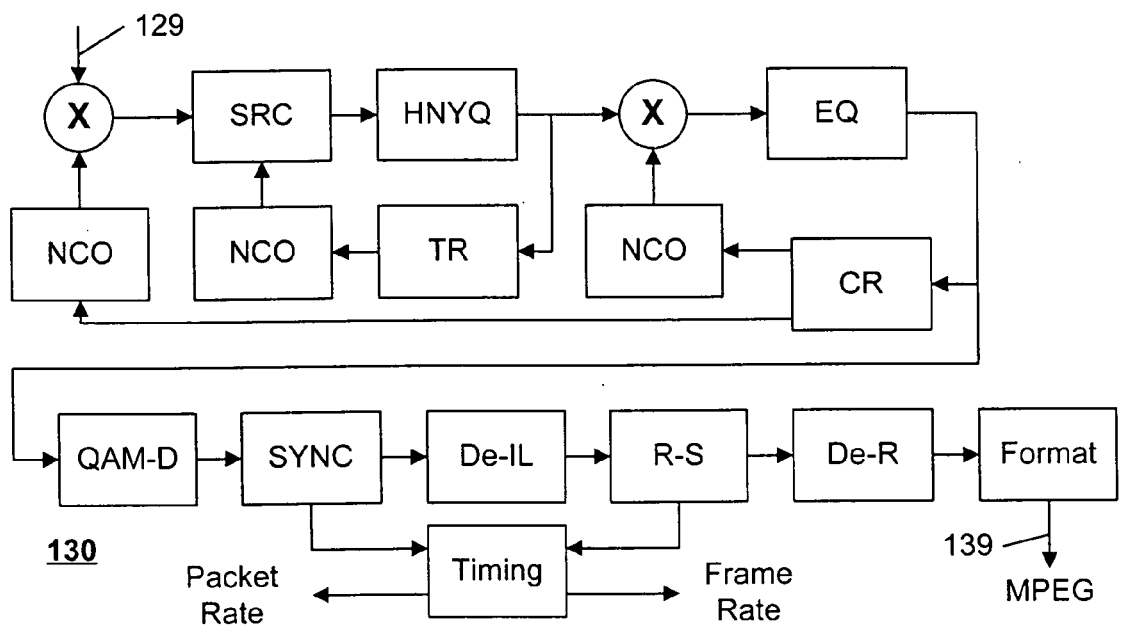
FIG. 1B [Prior Art]

REPROGRAMMABLE APPARATUS SUPPORTING THE PROCESSING OF A DIGITAL SIGNAL STREAM AND METHOD

BACKGROUND OF THE INVENTION

1. Field of the Invention

This invention relates to the field of signal processing, and in particular to a programmable bridge that facilitates the processing of digital signal streams among a variety of functional units and one or more digital signal processors.

2. Description of Related Art

FIG. 1A illustrates an example block diagram of a typical system 100 for receiving and processing a source input 101 for rendering via a user application 150. For example, the source input 101 may be a broadcast television signal, and the user application 150 may be the rendering of a television program on a display screen. The source input 101 may be an optical signal from a DVD or CD player, and the user application 150 may be a video or analog rendering device. The source input 101 may be a satellite or cellular telephone signal, and the user application 150 may be a wireless telephone.

An analog processor 110 filters and amplifies the analog source input 101, and a digital to analog converter 120 converts the filtered analog signal to a digital data stream. Optionally, if the source input 101 is a digital signal, the analog processor 110 and analog to digital converter 120 can be bypassed.

A channel decoder 130 receives the digital stream 129 from the converter 120, or from the source input 101 directly, and performs a variety of signal processing functions, generally related to frequency and sample rate conversion, adaptive filtering, error correction, anti-aliasing, and the like. Depending upon the application, the channel decoder 130 may be referred to by a variety of alternative names, such as: radio receiver, baseband modulator, digital receiver, tuner, demodulator, and so on. To illustrate the complexity of a typical channel decoder 130, an example decoding of a received digital stream 129 into an MPEG stream 139 is illustrated in FIG. 1B. The received stream 129 is demodulated and equalized to provide a QAM symbol stream 133, using techniques common in the art. The QAM symbol stream 133 is decoded to produce an MPEG stream as the output 139 of the channel decoder 130.

A source decoder 140 performs application specific functions on the decoded channel signal. For example, the decoded channel signal 139 may be an MPEG encoding of a video stream, and the source decoder 140 performs the functions, such as inverse DCT, motion vector compensation, and the like, that are related to the conversion of an MPEG signal into a video stream that can be rendered on a display device via the user application 150. If the input source 101 is a telephone signal, the source decoder 140 performs the functions, such as GSM decoding, to provide a signal that can be rendered to the telephone handset via the user application 150.

One of the difficulties in a traditional processing system such as illustrated in FIGS. 1A and 1B is the fact that standards are still evolving in most application fields. These standards typically evolve, or new standards emerge, to support enhanced or additional capabilities. A product that supports these additional capabilities will likely command a higher selling price, or a larger market share, than a 'prior-generation' device that was designed before these capabilities were available. The example channel decoder 130 in FIG. 1B, for example, corresponds to an "ITU A" compatible channel decoder. This decoder 130 includes a sync detector 132 that provides an input to the timing recover device 135 for synchronizing the incoming stream 129. The de-interleaver 133 provides a de-interlaced signal to the Reed-Solomon decoder 134. The Reed-Solomon decoder 134 also provides a synchronizing signal to the timing recovery device 135 for synchronizing the packet and frame rates. The de-randomizer 136 organizes the received and decoded stream into a coherent input for the formatter 137, which outputs an MPEG-formatted stream 139. An "ITU B" compatible channel decoder, however, performs the de-randomizer 136 function immediately after the sync detector 132, and before the de-interleaver 133. Additionally, in "ITU B", an MPEG-specific timing recovery device (not illustrated in FIG. 1B) is typically used to control the formatter 137, and the MPEG-specific timings are also provided to the timing recovery device 135 of FIG. 1B. Thus, a change from an "ITU A" compatible device to an "ITU B" compatible device requires a somewhat substantial architectural change.

Programmable digital signal processors provide the potential of allowing prior-generation devices to be reprogrammed to support the latest standard, and/or to provide additional or enhanced capabilities without requiring a structural design change. This potential, however, is limited to function that can be successfully embodied in a digital signal processor (DSP) in a cost effective manner. Some functions require processing speeds that cannot currently be provided by a general purpose DS; some functions are more efficiently performed in a special purpose, or application specific, device because of bandwidth limitations; and so on.

Structured design also provides the potential of minimizing the impact of a change of requirements for a product. Preferably, a design is structured to allow individual blocks, or modules, to be replaced to provide the required additional capabilities, without requiring a change to modules unrelated to the changed capability, and without a change to the architecture of the overall system. The prior generation module is replaced by the latest generation module, and the overall system regains its competitive standing in the marketplace. This potential, however, is limited to well-contained changes of requirements. Despite efforts to anticipate future changes and to provide maximum design flexibility, new requirements often cause a restructuring of the system architecture. In some instances, functions that had been unrelated become related to provide a particular function; new input signals may be required within modules that had not previously used these signals; efficiencies become realizable with a new architecture that had not been feasible in the old architecture; and so on.

BRIEF SUMMARY OF THE INVENTION

It is an object of this invention to provide an architecture that facilitates a structural change to the architecture without requiring a substantial design change. It is a further object of this invention to provide a means for modifying the dataflow among functional units in a system without requiring a substantial design change. It is a further object of this invention to provide a device that facilitates a programmable dataflow among functional units. It is a further object of this invention to provide an architecture that facilitates a reallocation of function among special and general purpose devices as technologies evolve.

These objects and others are achieved by providing an architecture that includes a reconfigurable bridge for routing data among functional units. Register transfer units effect the routing of data among registers that are associated with each functional unit. Synchronous and asynchronous register transfers are supported, including interrupt signal generation for efficient digital signal processor support. A preferred embodiment of the reconfigurable bridge includes a plurality of reconfigurable datapath units that provide ancillary functions to facilitate the processing and pre-processing of data items as they are transferred among registers. A preferred embodiment of the invention also includes an instruction memory that contains instructions to effect the desired register transfers and ancillary operations.

BRIEF DESCRIPTION OF THE DRAWINGS

The invention is explained in further detail, and by way of example, with reference to the accompanying drawings wherein:

FIGS. 1A–1B illustrate an example block diagram of a prior art system for receiving and processing a source input for rendering via a user application.

Throughout the drawings, the same reference numerals indicate similar or corresponding features or functions.

DETAILED DESCRIPTION OF THE INVENTION

Figure 2A:
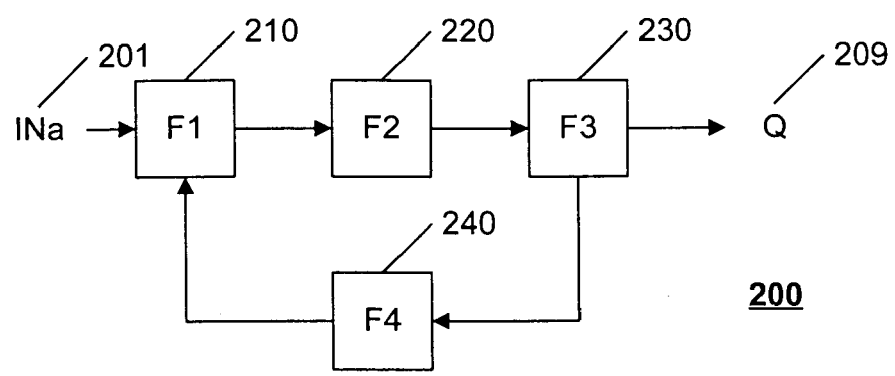
FIGS. 2A–2B illustrate an example transformation of a system dataflow in accordance with this invention.
Figure 2B:
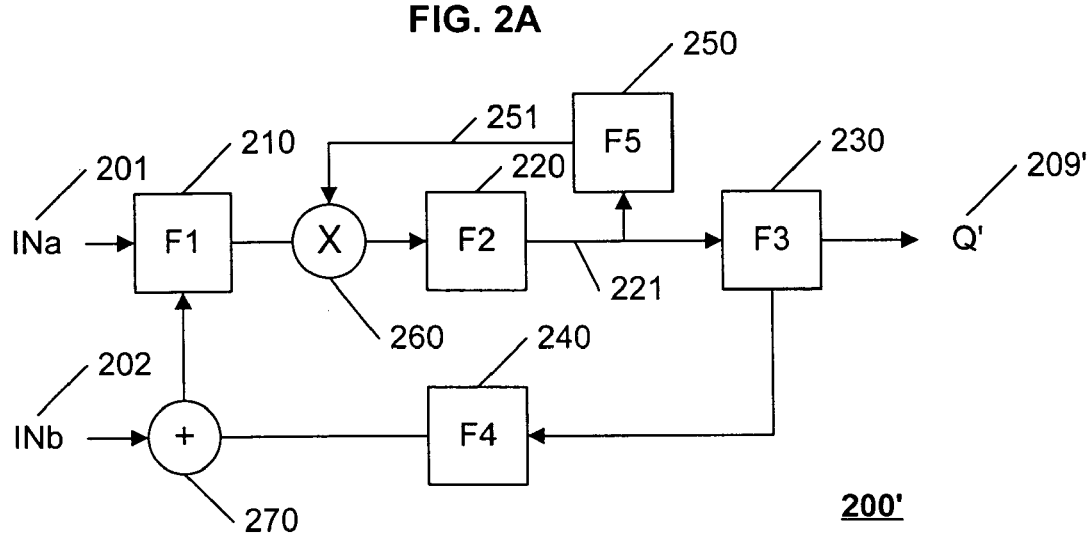

FIGS. 2A–2B illustrate an example transformation of a system dataflow 200, 200' in accordance with this invention. The example dataflow 200 of FIG. 2A shows an input INa 201 being processed by a variety of functional units F1–F4 210–240 to produce an output Q 209. The functional units F1–F4 can represent any of a variety of functions. In the context of a digital television system such as illustrated in FIG. 1, the functions F1–F4 may represent blocks in the channel decoder that use feedback, via F4 to modify the characteristics of a filter F1. In this example, block F2 may be a demodulator, and the block F3 may extract a parameter from a demodulated signal to provide the feedback to block F4.

As technologies advance, and new features and capabilities become accepted, the dataflow 200 may need to be modified as illustrated in FIG. 2B to provide these features and capabilities as a modified output Q' 209'. As illustrated, the function unit F2 may be found to provide a more desirable output when its input is modulated by (multiplied by) a signal 251 that is a function F5 250 of its output 221. Similarly, the feedback via function unit F4 may be preferably combined (added to) another input INb 202. This modified dataflow is provided for illustration purposes as a modification that would typically require a substantial structural change to a conventional dataflow architecture. That is, for example, if the function blocks F1–F4 of FIG. 2A were blocks of circuitry on a printed circuit board, the printed circuit board would need to be replaced by another board that also contained the function block 250, the multiplier 260, and the adder 270. If a modular design is used, wherein each function block F1–F5 plugs into a common bus network, additional modules corresponding to the multiplier 260, and the adder 270 would need to be added to the system. If the modification also required a change to the timing or sequencing of the information flow among these blocks, the interface logic in one or more of the functional blocks F1–F4 would need to be modified accordingly.

In accordance with this invention, a system is provided that allows for a modification of a dataflow such as illustrated in FIGS. 2A–2B without requiring a substantial change to the architecture of the system that supports these dataflows.

Figure 3:
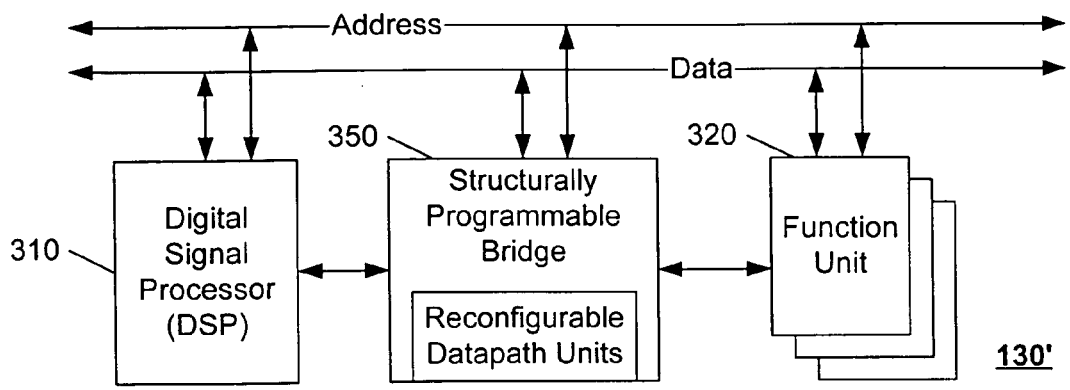
FIG. 3 illustrates an example block diagram of a channel decoder in accordance with this invention.

For ease of understanding, a channel decoder is used herein as a paradigm for the principles of this invention. FIG. 3 illustrates an example block diagram of a channel decoder 130' that includes a structurally reprogrammable bridge 350 that facilitates a reconfiguration of the dataflow among the components 310, 320 that form the channel decoder 130'. That is, for example, the functional units F1–F4 of FIG. 2 may correspond to the function units 320 or the DSP 310 of FIG. 3, and the bridge 350 provides the interconnection among the components 310, 320 to effect the block diagram illustrated in FIG. 2. The bridge 350 in this example takes the output of a functional unit corresponding to F1 and provides it as an input to functional unit F2; it also takes the output of functional unit F2 and provides it to functional unit F3, and so on, to effect the desired flow of data among the components 310, 320 to provide the desired output Q, Q' from the source input INa, INb.

Any of a variety of techniques can be applied the effect the communications among the components 310, 320 so that a change of requirements only requires a change to the bridge 350 of the reconfigurable channel decoder 130'. In a preferred embodiment of this invention, the dataflow among components 310, 320 is effected via a register transfer system and protocol, as illustrated in FIG. 4.

Figure 4:
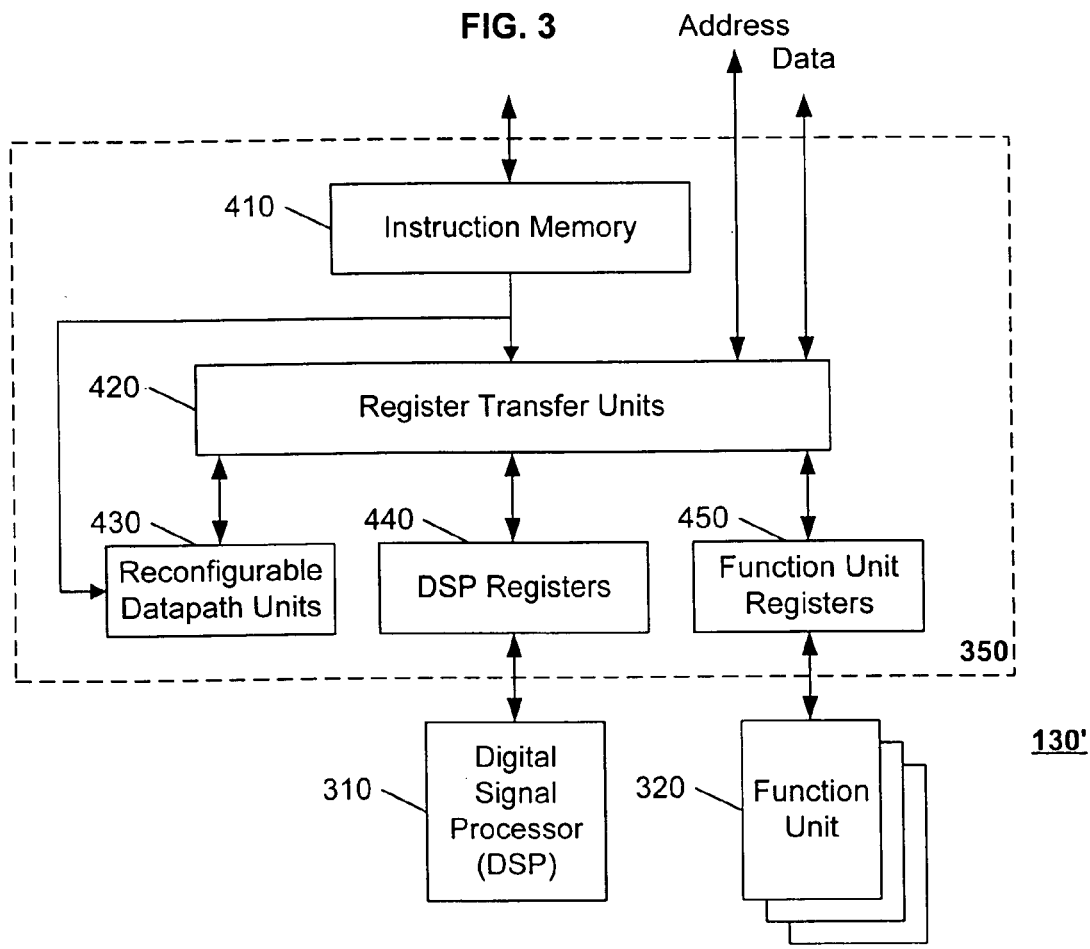
FIG. 4 illustrates an example block diagram of a structurally programmable bridge in accordance with this invention.

FIG. 4 illustrates an example block diagram of a structurally programmable bridge 350 in accordance with this invention. The programmable bridge 350 includes a plurality of interface registers 440, 450 for interfacing with the DSP 310 and function units 320. The DSP 310 is illustrated as a separate block from the function units 320 for ease of understanding, although conceptually it could be considered one of the function units 320. The function units 320 are typically special purpose functional units that are optimized for their given task. As noted above, these function units 320 could include conventional signal processing blocks, such as a baseband modem, a tuner, an error corrector, a filter, and so on. As "software radios" become more prevalent, functional blocks corresponding to the functions developed to support software radio will become common. In accordance with this invention, each of these function units 320 is allocated one or more interface registers 450 for communicating data to and from other function units 320, to and from the DSP 310, and to and from the external environment as well. For efficiency and ease of data transfer, the function units 320 typically operate in a synchronous manner, and are often configured in a pipeline-processing manner. The DSP 310 is a conventional programmable digital signal processor, and similarly uses one or more interface registers 440 to communicate to and from the function units 320 and the external environment. As contrast to conventional function units 320, a DSP often operates effectively and efficiently as an asynchronous, event-driven, device, and the bridge 350 includes synchronizing signals and interrupt signals (not illustrated) for maintaining the appropriate timing relationships among the components 310, 320.

In a preferred embodiment of this invention, the programmable bridge 350 includes a plurality of register transfer units 420 that each effect the transfer of data among interface registers 440, 450. In accordance with one aspect of this invention, the register transfer units 420 are controlled via instructions stored in an instruction register 410. The instruction is of the general form:

Move Rs Rd, or

MoveI Rs Rd, where Rs is the source register from which the data is transferred, and Rd is the destination register to which the data is transferred. External inputs and outputs, such as INa, INb, Q, and Q' in FIGS. 2A–2B are also treated as registers. The MoveI instruction also generates an interrupt signal to the component 310, 320 corresponding to the destination register, typically the DSP 310. For example, a program to effect the structure of FIG. 2A could be written as:

Move INa F1.in1, Move F4.out1 F1.in2;                     (1)

Move F1.out1 F2.in1;                                       (2)

Move F2.out1 F3.in1;                                       (3)

Move F3.out1 F4.in1, Move F3.out2 Q.                       (4)

The program step at (1) provides the two inputs, INa 201 and the output of function unit F4 240, to the function unit F1; the program step at (2) provides the output of the function unit F1 to the input to function unit F2; and so on. In a preferred embodiment, instructions on the same line are executed within a single time period, such as a DSP clock period, and instructions on the next line are executed at a 'next' time period. The set of the four lines above is executed at each major time period, such as a data period. Other conventions for programming languages, or design languages, common in the art, may also be used. Note that by controlling the flow of data among function units via a programmable register transfer, the system architecture can be changed without a physical change of the system. Note also that this change of system architecture can include a replacement of a special purpose functional unit by including its function in the programmable DSP 310, thereby reducing system cost as programmable DSPs become increasingly powerful. In like manner, if advancing technologies allow function units to be combined to reduce costs, the reconfiguration of the system to support such changes can also be supported via a programming change.

In accordance with another aspect of this invention, the programmable bridge 350 also includes reconfigurable datapath units 430. These datapath units 430 are structured to allow a transformation of the data as it is being transferred among the registers 440, 450. In a preferred embodiment, the datapath units 430 are configurable to provide such functions as addition, subtraction, multiplication, and division. Other functions may also be provided. These functions are effected via a command:

Config RDUn mode, where RDUn is an indentifier of one of the reconfigurable datapath units, and mode is the function that is to be executed. The following is an example program that effects the structure of FIG. 2B:

Move INa F1.in1, Config RDU1 add, Move INb
  RDU1.in1, Move F4.out1 RDU1.in2, Move
  RDU1.out F1.in2;                                         (5)

Config RDU2 mpy, Move F1.out1 RDU2.in1, Move
  F5.out1 RDU2.in2, Move RDU2.out1 F2.in1;                 (6)

Move F2.out1 F5.in1, Move F2.out1 F3.in1;                  (7)

Move F3.out1 F4.in1, Move F3.out2 Q'.                      (8)

The "Config RDU1 add" statement in the program step at (5) configures an RDU 430 in FIG. 4 to effect an addition function, corresponding to the adder 270 of FIG. 2B. The "Move INb RDU1.in1" statement effects a transfer of data from the new input, INb 202, to a first input of this RDU 270; "Move F4.out1 RDU1.in2" statement effects a transfer of the output of function unit F4 240 to the other input of this RDU 270; and, "Move RDU1.out F1.in2" moves the result of the addition at this RDU 270 to the second input of function unit F1 210. In like manner, a second RDU is configured as a multiplier via the "Config RDU2 mpy" statement at (6), corresponding to the multiplier 260 of FIG. 2B, and the other statements effect the routing of the inputs and output of this RDU 260.

As can be seen, by providing a reconfigurable bridge 350, with reconfigurable datapath units 430, substantial changes to the system architecture can be effected, via a change to the configuration of the bridge 350 and datapath units 430, rather than a change to the underlying physical structure of the system.

The ability of the system to support current and future requirements is dependent upon the number of register transfer units in the register transfer units block 420. A set of K nonblocking register transfer units will support up to $N1 \times M1 <= K$ simultaneous register transfers, where N1 is the total number of inputs and M1 is the total number of outputs being interconnected via the register transfers. Although N1 and M1, and therefore K, can be chosen to correspond to the total possible number of inputs N and total possible outputs M from the datapath units 430 and interface registers 440, 450, N1 and M1 are preferably chosen based on heuristics, based on estimates of peak demand, to reduce the cost of the bridge 350. In like manner, the number of reconfigurable datapath units 430 is based on estimates of future requirements. Typically, a system in a new technology will have a higher proportion of register transfer units 420 and datapath units 430 than one that embodies a fairly stable technology, because of the higher likelihood of change in a new technology. In a preferred embodiment, the instructions used to configure the register transfer units comprise $M1*\log_2 M + N1*\log_2 N$ bits to describe the interconnect.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

We claim:

1. A bridge comprising:
   a plurality of interface registers that are configured to facilitate communication of data with a plurality of function units,
   a plurality of register transfer units, operably coupled to the plurality of interface registers, that facilitate transfers of data among at least two interface registers of the plurality of interface registers, and
   at least one datapath unit, operably coupled to the plurality of register transfer units, that facilitates a transformation of at least one data item of the data that is transferred among the interface registers.

2. The bridge of claim 1, further comprising:
   an instruction memory that is configured to contain register transfer instructions, and
   wherein the operable coupling of the plurality of register transfer units and the plurality of function units is effected via the register transfer instructions.

3. The bridge of claim 1, further comprising:
an instruction memory that is configured to contain register transfer instructions, and
wherein the operable coupling of the plurality of register transfer units and the plurality of function units and the at least one datapath unit is effected via the register transfer instructions.

4. The bridge of claim 1, wherein:
at least one of the function units is a programmable digital signal processor.

5. The bridge of claim 1, wherein the function units implement a baseband modem, a tuner, an error corrector, and a filter.

6. The bridge of claim 1, wherein the function units implement a software radio.

7. The bridge of claim 4, wherein the programmable digital signal processor is capable of being reprogrammed to perform a function provided by one of the function units.

8. A signal processing system comprising:
a receiver that is configured to provide a digital input stream,
a channel decoder, operably coupled to the receiver, that is configured to decode the digital input stream into a decoded signal stream, and
a user application, operably coupled to the channel decoder, that is configured to render an output corresponding to a channel of the digital input stream based on the decoded signal stream,
wherein the channel decoder comprises a bridge comprising:
a plurality of interface registers, each associated with a processing unit of a plurality of processing units, and
a plurality of register transfer units, operably coupled to the plurality of interface registers, that facilitate:
transfers of data among interface registers of the plurality of interface registers,
transfers of data of the digital input stream among interface registers of the plurality of interface registers, and
transfers of data from the interface registers to provide the decoded signal stream.

9. The signal processing system of claim 8, wherein the channel decoder further comprises:
an instruction memory that is configured to contain register transfer instructions, and
wherein the operable coupling of the plurality of register transfer units and the plurality of processing units is effected via the register transfer instructions.

10. The signal processing system of claim 8, further comprising:
at least one datapath unit, operably coupled to the plurality of registor transfer units, that facilitates a transformation of at least one data item of the data that is transferred among the interface registers.

11. The signal processing system of claim 8, wherein:
at least one of the processing units is a programmable digital signal processor.

12. The signal processing system of claim 8, wherein the function units implement a baseband modem, a tuner, an error corrector, and a filter.

13. The signal processing system of claim 10, wherein the channel decoder further comprises:
an instruction memory that is configured to contain register transfer instructions, and
wherein the operable coupling of the plurality of register transfer units and the plurality of processing units and the at least one datapath unit is effected via the register transfer instructions.

14. A method, comprising:
receiving data at a plurality of interface registers, the interface registers operable to communicate with a plurality of function units;
allowing at least one of the units to process the data in at least one of the interface registers;
communicating the data among at least two of the interface registers using a plurality of register transfer units; and
allowing at least one of the function units to further process the data in at least one of the interface registers;
wherein the function units implement a baseband modem, a tuner, an error corrector, and a filter.

15. The method of claim 14, wherein communicating the data among at least two of the interface registers comprises using register transfer instructions in an instruction memory to communicate the data among at least two of the interface registers.

16. The method of claim 14, further comprising transforming at least one data item of the data that is transferred among the interface registers.

17. The method of claim 14, wherein at least one of the function units is a programmable digital signal processor.

18. The method of claim 14, wherein receiving data comprises receiving a digital input stream from a receiver.

19. The method of claim 18, further comprising generating a decoded signal stream using the digital input stream.

20. The method of claim 19, further comprising communicating the decoded signal stream to a user application operable to render an output corresponding to a channel of the digital input stream based on the decoded signal stream.

\* \* \* \* \*